Patented Aug. 2, 1949

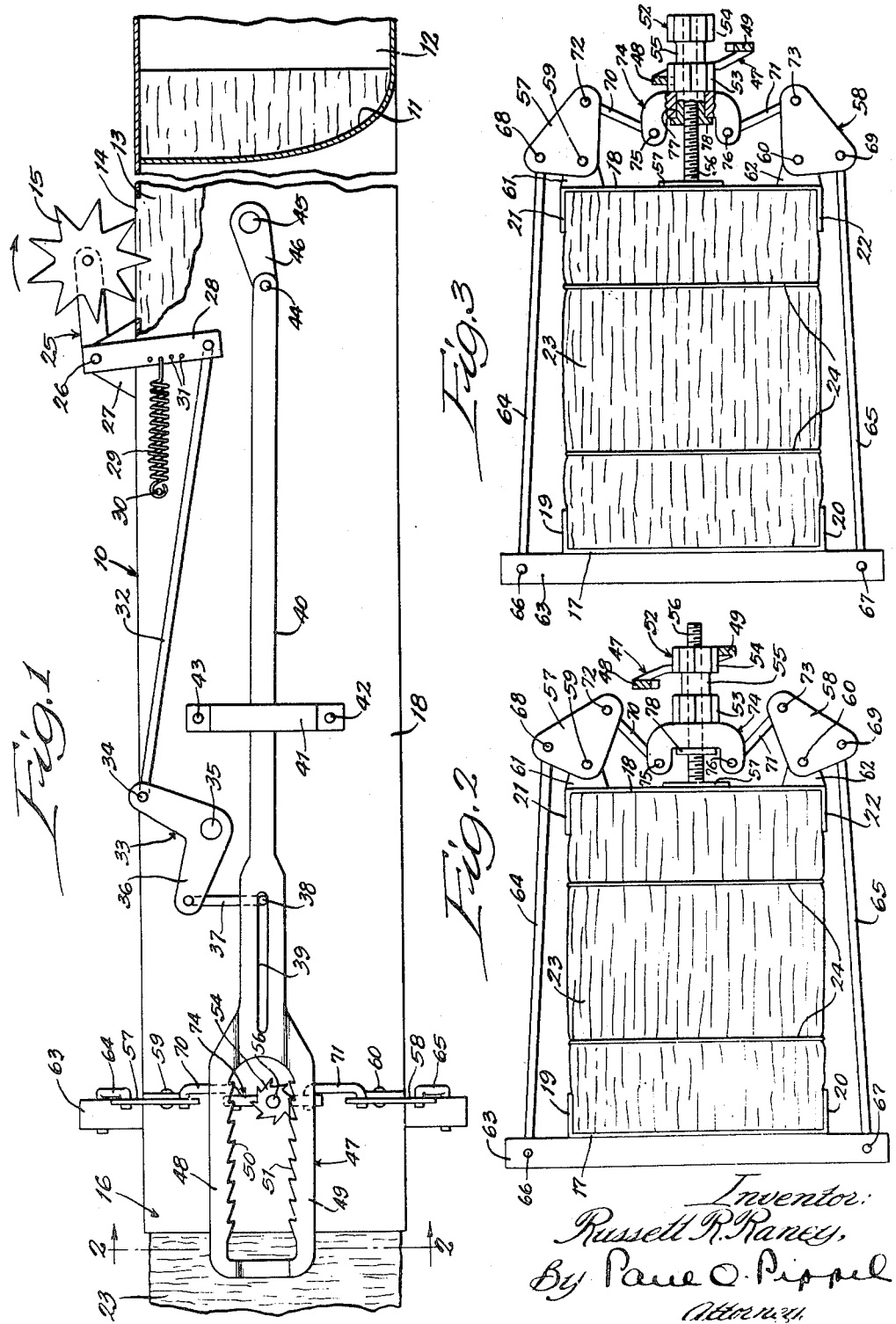

2,478,012

UNITED STATES PATENT OFFICE 2,478,012

BALER

Russell R. Raney, La Grange, Ill., assignor to International Harvester Company, a corporation of New Jersey Application April 2, 1945, Serial No. 586,197

18 Claims. (Cl. 100—23)

This invention relates to a new and improved baler having means for automatically contracting and expanding the discharge end of the bale chamber depending on the density of the bale at the time of initial compression of the bales being formed.

Balers are generally equipped with an elongated bale chamber in which the bale is formed, tied and then finally expelled at one end of the chamber. The hay or straw being baled is sometimes dry and causes only slight friction against the inner sides of the bale forming chamber, whereas on other occasions the material to be baled may be wet and sticky and possess characteristics which cause a great amount of friction of the bale with the inner sides of the bale chamber. The bales are formed in the bale chamber by a reciprocating plunger which recedes to a point behind a feed inlet opening in the bale chamber and then proceeds forwardly to a point beyond the feed inlet opening thus compressing the material fed into the bale forming chamber. When the bale has attained some predetermined size, it is then tied with a tie strand such as twine or wire. The formation of succeeding bales causes the previously formed bales to be pushed rearwardly or toward the discharge end of the elongated bale forming chamber. During this rearward movement of the newly formed bales, the bales are permanently formed in their desired shape, and it is quite essential that proper tension be applied at the discharge end of the elongated chamber. In present day balers, the discharge end of the bale chamber is constructed so as to have some degree of outward yielding. Spring tension is provided and within certain limits the discharge end may spread outwardly so as to permit passage of bales. However, the great variance in quality of baling material exceeds the effective range of bale discharge opening as permitted by use of a spring, and hence there is a definite need for some device to automatically vary the size of the discharge end of a bale forming chamber. The chief drawback to the use of springs is the fact that the force exerted by the spring increases as it is compressed, and hence if a bale of relatively high frictional material passes through the discharge opening the force and friction on the bale are increased rather than diminished as desired.

The bales being formed have a definite relationship as to hardness or compactness with the bales being discharged from the end of the bale forming chamber. If the bale being discharged causes a great amount of friction with the walls of the discharge opening, then this bale causes a back pressure on the bales being formed behind it, thus causing the bales being formed to be packed more densely. If, however, the bale being discharged is dry and slides freely through the walls of the discharge opening, the back pressure on the bale being formed is negligible and the bale will thus be packed relatively loosely. In the past, the need for automatically adjustable discharge openings on balers has been slight, for the reason that balers have been stationary machines, and the hay or straw to be baled at one time has all been of substantially the same quality. Under these conditions the discharge opening may be preadjusted to accommodate the quality of material being baled, and this one adjustment will be sufficient for the entire baling "run." Now, however, with pick-up balers it is possible and highly probable that the material to be baled will vary greatly, thus necessitating constant adjustments for the discharge opening of the bale chamber. The primary reason for varying the discharge end of a bale chamber is to provide for uniformly packed bales and also to permit ready sliding of the tie strand around the bale being formed without fear of the strand breaking and causing great delay in the baling operation. It is therefore a particular object of this invention to provide a discharge opening of variable size depending directly upon the density or compactness of the material being baled.

Another important object of this invention is to provide an automatically variable size discharge opening for balers which is responsive to the type of material being baled.

Other and further important objects will become apparent from the following detailed description when read in conjunction with the accompanying drawings.

Figure 1 is a side elevational view partly in section of a bale forming chamber;

Figure 2 is a sectional view taken on the line 2—2 of Figure 1 showing the size of the discharge opening increased; and Figure 3 is a sectional view similar to Figure 2.

As shown in the drawings:

The reference numeral 10 indicates generally an elongated bale forming chamber having a feed opening 11 at some point near the forward end thereof and equipped with a reciprocating plunger 12 having a stroke extending from a point forwardly of the feed inlet 11 to a point rearwardly of the feed opening 11. Hay, straw or other material to be baled is compressed by the reciprocating plunger 12, and after reaching some predetermined size the bale is then tied, preferably automatically, with either a twine or wire strand. The baling material is shown at 13, and directly above the forming portion of the chamber is a narrow slot 14 adapted to have a star wheel 15 ride therein. The elongated bale chamber 10 includes a discharge end 16 through which previously formed and tied bales are discharged upon and by the formation of new bales.

The discharge end 16 of the bale chamber 10 is best shown in Figures 2 and 3 and includes side members 17 and 18 both of which have inturned flanges at their upper and lower ends. These flanges for the side sheet 17 are shown at 19 and 20, and the flanges for the side sheet 18 are shown at 21 and 22. These side members 17 and 18 are yieldable inwardly and outwardly, and this is shown in Figure 3 in which the side sheets 17 and 18 are spread considerably farther apart than in Figure 2.

A completed bale of material 23 is shown as being discharged from the bale chamber 10 and through the discharge end 16. As shown in Figures 2 and 3, this bale 23 has been tied with a pair of tie strands 24. If this bale 23 is of such a material that it causes great friction against the inner sides of the plates 17 and 18, then it takes considerably more pressure to cause the bale to be pushed through the discharge opening 16. Such a condition causes a back pressure on the bale being formed and it is pressed more compactly so that the star wheel 15 is less able to penetrate the bale surface through the slot 14. As stated in the objects above, there is a definite relationship between the bale being discharged and the density of the bale being formed, and it is upon this principle that the present invention is based. The star wheel 15 is mounted on a bell-crank lever 25 which is pivoted at 26 on an upwardly extending lug 27 from the elongated bale chamber 10. A downwardly extending arm 28 of the bell-crank 25 is anchored to a spring 29 which normally tends to rotate the bell-crank 25 in a clockwise direction around its pivot 26 so that the star wheel has a tendency to penetrate the material 13 of the bale being formed. The spring 29 extends from an outwardly projecting pin 30 on the side wall 18 of the bale chamber 10 to the arm 28. A plurality of spaced openings 31 are provided in the arm 28 for reception of the end of the spring 29. Shifting of the spring from one of these openings 31 to another one causes either an increase or a decrease in the amount of force which tends to cause penetration by the star wheel 15. The lower end of the arm 28 is joined by a rearwardly extending link 32 which is attached at its rearward end to a bell-crank lever 33 at 34. The bell-crank 33 is mounted for pivotal movement on the side of the bale chamber 10 at 35. A rearwardly extending arm 36 of this bell-crank 33 carries a downwardly extending link 37, the lower end 38 of which is hooked through a longitudinally extending slot 39 in a long arm member 40.

A guide strap 41 is fastened to the side of the bale chamber 10 at 42 and 43 and permits angular movement of the long arm 40 about its pivot at 44. A power-driven shaft 45 operated from the baling machine source of power, which also operates the reciprocating plunger 12, has a crank arm 46 connected to the arm 40 at 44 thereby imparting longitudinal reciprocation to the arm 40. It will be understood that as the baling machine operates, this arm 40 will be constantly reciprocating on one side of the bale chamber 10. A ratchet link 47 is offset, as shown in Figures 2 and 3, so that the upper part thereof 48 is positioned more closely to the side wall 18 of the bale chamber 10 than the lower portion 49. Each of the parts 48 and 49 comprises a ratchet rack having teeth 50 and 51 which face inwardly toward each other. A nut 52 comprises inner and outer ratchet wheels 53 and 54 respectively. The wheels 53 and 54 are spaced by a centrally positioned collar 55 and the entire nut 52 rotates as a unit. The ratchet link 47 is adapted to engage either one of these ratchet wheels 53 or 54, and inasmuch as each of the wheels has oppositely directed or right and left hand teeth, the nut will rotate in an opposite direction depending on which wheel is being actuated. The lower rack portion 49 of the ratchet link 47 is adapted to engage and rotate the outer ratchet wheel 54 when the star wheel 15 has failed to penetrate the material 13 in the bale being formed, so that the link 37 exerts an upward pull on the arm 40 through the slot 39. Under these particular circumstances it is evident that the bale 23 being discharged has characteristics which cause a great amount of friction on the walls of the bale chamber 10 and hence cause the bale 13 being formed to be packed very tightly. The immediate response is evidenced by the upward movement of the star wheel 15 or rather a failure of the star wheel to penetrate to any marked degree the bale 13 merely by the action of the spring 29. Hence the ratchet rack 49 will engage the ratchet wheel 54, and due to the constant reciprocation of the arm 40 by means of the power driven shaft 45, the nut 52 will be unscrewed from a threaded bolt or post 56 which is fixedly mounted, projecting from the side wall 18 of the bale chamber 10 as shown at 57. As the arm 40 reciprocates it will be evident that the nut will move outwardly to the position as shown in Figure 3, where the discharge opening of the bale chamber has increased considerably in its width.

The mechanism for increasing the size of the discharge end 16 of the bale chamber 10 comprises a pair of alined bell-crank levers 57 and 58 mounted at the upper and lower sides of the side plate 18 and pivoted at 59 and 60 respectively on lugs 61 and 62 projecting outwardly from the side sheet 18. A vertical bar 63 is positioned adjacent the side sheet 17 and is adapted to cause inward and outward movement of the side sheet 17 when lateral movement is imparted to it. This vertical bar 63 is attached by means of links 64 and 65 at its upper and lower ends 66 and 67 to the bell-crank levers 57 and 58 at 68 and 69 respectively. Therefore, as the bell-cranks 57 and 58 rotate about their respective pivots 59 and 60, the vertical bar 63 will be either pulled inwardly or spread outwardly as the case may be, and the bale chamber discharge opening will either be contracted or expanded accordingly. The bell-cranks 57 and 58 are joined by links 70 and 71 at 72 and 73 to a non-rotatable sleeve member 74 at 75 and 76 respectively. This non-rotatable sleeve 74 is journaled for relative rotation on a sleeve-like extension 77 of the nut 52. The inner end of the sleeve-like extension 77 is turned outwardly so that an annular flange 78 extends upwardly along the sides of the non-rotatable sleeve member 74, thereby insuring that when the nut 52 moves inwardly or outwardly along the screw 56, the collar or sleeve member 74 will be similarly moved but without rotation. It is not essential that the sleeve be attached to the nut 52 but only that it be loosely journaled on the threaded post 56 inasmuch as outward movement of the sleeve will occur merely by spreading bale pressures. As this collar 74 moves from its position as shown in Figure 2 to its position as shown in Figure 3, the links 70 and 71 have assumed a nearer vertical position, thus causing counter-clockwise movement of the bell-crank 57 about its pivot 59 and clockwise movement of the bell-crank 58 about its pivot 60 as viewed in Figure 3. The result, of course, is an enlarging of the bale chamber discharge.

When the bale 23 thus has more room through which it may be discharged, the back pressure it causes will be reduced thereby causing the succeeding bales being formed to be less tightly packed. When this occurs the star wheel 15 will then be permitted to penetrate a greater distance into the material 13 causing a downward movement of the link 37 through the bell-cranks 25 and 33 to a position where the nut 52 is between the ratchet racks 48 and 49 where neither one engages the ratchet wheels 53 or 54. In other words, this would be the normal or desired density for the bales being formed with just the right amount of back pressure caused by the bale being discharged.

If, however, the other extreme is reached where the bale 23 is of such a material causing relatively no friction with the sides of the discharge openings 17 and 18, then the back pressure on the bale being formed is not sufficient and the star wheel will be able to penetrate very deeply thus causing a continued downward movement of the link 37 and a resultant downward movement of the entire arm 40, whereby the ratchet rack 48 will come in contact with the ratchet wheel 53. Upon reciprocation of the arm 40, the nut 52 is screwed back onto the bolt 56 thus causing a contracting of the discharge opening 16 and also building up a back pressure on the bale being formed.

This device may be arranged so that any amount of movement and change in the size of the discharge opening may be had. However, it is desirable that this range of movement be limited, and in order to accomplish this end, the ratchet wheels 53 and 54 have their width of some predetermined size so that when the reciprocating arm 40, which operates in a fixed plane, has moved the nut 52 out of the range of either one of the rack arms 48 or 49, then the nut 52 cannot be caused to move any farther by that particular rack arm. The offset in the ratchet link 47 is for the purpose of always engaging one of the ratchet wheels 53 or 54 when the arm 40 is moved up or down. The offset in this ratchet link and the spacing of the ratchet wheels 53 and 54 on the nut 52 are such that when the nut is tightened to a certain point, the ratchet teeth will have run out from under the teeth in the link. Loosening of the ratchet can be effected, by engagement of the upper ratchet rack 48 when the link 47 drops downwardly due to action of the star wheel. Conversely, this same procedure is effected in the opposite direction and the nut can only be loosened to the point where the rack 49 ceases to engage the ratchet wheel 54.

Numerous details of construction may be varied throughout a wide range without departing from the principles disclosed herein, and I do not propose limiting the patent granted hereon otherwise than as necessitated by the appended claims.

What is claimed is:

1. In a baler having a chamber in which material to be baled is compressed, said chamber having an opening for receiving material to be baled, means for compressing the material, said bale chamber having an adjustable outlet end portion, the restriction of which determines the density of the bale, means for lessening or increasing the restriction of said outlet portion of the bale chamber on the formed bales being discharged, means on the bale chamber engageable with the bale being formed, the position of which is determined by the density of the bale, and means interconnecting said last means and the restriction adjusting means for regulating the restriction in proportion to the density of the bale.

2. In a baler having a chamber in which material to be baled is compressed, means for compressing the material, said bale chamber having an adjustable discharge end portion, the restriction of which determines the compactness of the bales being formed, means for lessening or increasing the restriction of said outlet portion of the bale chamber on the bale being discharged, means on the bale chamber engageable with the bale being formed, the position of which is determined by the compactness of the bale, and means interconnecting said last means and the restriction adjusting means for regulating the restriction of the discharge end in proportion to the density of the bale being formed.

3. In a baler having an elongated chamber, a portion of which houses material being formed into bales and another portion through which completed bales are discharged, means for compressing the material, said bale chamber having an adjustable outlet end portion, said end portion including laterally movable sides, means for moving said sides laterally, means on the bale chamber engageable with the bale being formed, the position of which is determined by the density of the bale, and means interconnecting said last means and the means for moving the sides laterally for regulating said outlet end portion in proportion to the density of the bale.

4. In a baler having an elongated chamber, a portion of which houses material being formed into bales and another portion through which completed bales are discharged, means for compressing the material, said bale chamber having an adjustable outlet end portion, said end portion including laterally movable sides, means for moving said sides laterally, means on the bale chamber engageable with the bale being formed, the position of which is determined by the density of the bale, said means on the bale chamber including a star wheel rotatable on a hinged bracket and normally impelled under a constant pressure into the surface of the bale being formed, and means interconnecting said hinged bracket and the means for moving the sides laterally for regulating said outlet end portion in proportion to the density of the bale.

5. In a baler having an elongated chamber, a portion of which houses material being formed into bales and another portion through which completed bales are discharged, means for compressing the material, said bale chamber having an adjustable outlet end portion, said end portion including laterally movable sides, means for moving said sides laterally including a constantly reciprocating pawl cooperating with a rotatable ratchet, means on the bale chamber engageable with the bale being formed, the position of which is determined by the density of the bale, and means interconnecting said last means and the means for moving the sides laterally for regulating said outlet end portion in proportion to the density of the bale.

6. In a baler having an elongated bale forming and bale discharge chamber, a reciprocating plunger for compressing the forward end of the material to be baled, and means for varying the size of the bale discharge portion of the chamber including an element adapted to penetrate the material being formed into the bale and the degree of penetration acting to control the back pressure on the bale being formed by increasing or reducing the size of the bale discharge portion of the chamber.

7. In a baler having an elongated bale forming and bale discharge chamber, a reciprocating plunger for compressing the forward end of the material to be baled, means for varying the size of the bale discharge portion of the chamber comprising, a continuously reciprocating pawl member, a cooperative laterally shiftable ratchet member, and lever and linkage means for compressing or releasing said bale discharge portion depending on the lateral position of the ratchet member.

8. In a baler having an elongated bale forming and bale discharge chamber, a reciprocating plunger for compressing the forward end of the material to be baled, means for varying the size of the bale discharge portion of the chamber comprising, a continuously reciprocable and arcuately vertically swingable pawl member, cooperative laterally shifting ratchet members, lever and linkage means for compressing or releasing said bale discharge portion depending on the lateral position of the ratchet member, and an element adapted to penetrate the bale being formed and the degree of penetration of said element controlling the vertical position of said pawl member, whereby the vertical position of said pawl determines the ratchet member to be engaged thereby.

9. In a baler having an elongated bale forming and bale discharge chamber, a reciprocating plunger for compressing the forward end of the material to be baled, means for varying the size of the bale discharge portion of the chamber comprising, a continuously reciprocable and vertically shiftable dual pawl member, a pair of cooperative laterally shifting ratchet members, means for directly compressing or releasing said bale discharge portion depending on the lateral position of the pair of ratchet members, and a spring-pressed star wheel adapted to penetrate the bale being formed, whereby the amount of penetration directly fixes the vertical position of the dual pawl member and therefore determines which pawl will engage which ratchet.

10. In a baler having an elongated bale forming and bale discharge chamber, a reciprocating plunger for compressing the forward end of the material to be baled, means for varying the size of the bale discharge portion of the chamber comprising, a constantly reciprocable and vertically shiftable dual rack pawl member, a pair of cooperating ratchet wheels threadedly engaging a post projecting from said bale chamber, lever and linkage means for directly compressing or releasing said bale discharge portion depending on the lateral position of the ratchet members, and a spring pressed star wheel arranged to penetrate the bale being formed, whereby the degree of penetration fixes the vertical position of the pawl member and determines the engagement of the pair of pawl racks with the ratchet wheels for moving the ratchet wheels inwardly or outwardly on the post and thereby compressing or expanding the discharge portion of the bale chamber and increasing or decreasing the back pressure on the bale being formed.

11. In a baler having an elongated bale forming and bale discharge chamber, a reciprocating plunger for compressing the forward end of the material to be baled, means for varying the size of the bale discharge portion of the chamber comprising, a constantly reciprocable and vertically shiftable dual rack pawl member, a pair of cooperating ratchet wheels threadedly engaging a post projecting from said bale chamber, said ratchet wheels having oppositely directed ratchet teeth respectively, lever and linkage means for directly compressing or releasing said bale discharge portion depending on the lateral position of the ratchet wheels, and a spring pressed star wheel arranged to penetrate the bale being formed, whereby the degree of penetration fixes the vertical position of the pawl member and determines the engagement of the pair of pawl racks with the ratchet wheels for moving the ratchet wheels inwardly or outwardly on the post and thereby compressing or expanding the discharge portion of the bale chamber and increasing or decreasing the back pressure on the bale being formed.

12. In a baler having an elongated bale forming and bale discharge chamber, a reciprocating plunger for compressing the forward end of the material to be baled, means for varying the size of the bale discharge portion of the chamber comprising, a reciprocating and vertically shiftable upper and lower racked pawl member, a nut member having spaced right and left hand ratchet wheels, a threaded post fixed to the side of the bale chamber and extending outwardly therefrom, said nut member engaging said post and shiftable laterally therealong upon rotation thereof by either the upper or lower rack of the pawl member, and lever means operable by said nut member to compress or expand the size of the discharge portion of the bale chamber.

13. In a baler having an elongated bale forming and bale discharge chamber, a reciprocating plunger for compressing the forward end of the material to be baled, means for varying the size of the bale discharge portion of the chamber comprising, a reciprocating and vertically shiftable upper and lower racked pawl member, a nut member having spaced right and left hand ratchet wheels, a threaded post fixed to the side of the bale chamber and extending outwardly therefrom, said nut member engaging said post and shiftable laterally therealong upon rotation thereof by either the upper or lower rack of the pawl member, lever means operable by said nut member to compress or expand the size of the discharge portion of the bale chamber, a star wheel arranged to project through a slot in the elongated chamber at the bale forming portion, a bell crank member supporting said star wheel for arcuate movement into the bale being formed, the amount of movement depending on the compactness of the bale, and lever means joining said bell crank and said pawl member for fixing the vertical position of the pawl member and hence determining whether the upper or lower rack thereof will engage the ratchet wheeled nut.

14. In a baler having an elongated bale forming and bale discharge chamber, a reciprocating plunger for compressing the forward end of the material to be baled, means for varying the size of the bale discharge portion of the chamber comprising, a reciprocating and vertically shiftable offset upper and lower racked pawl member, a nut member having spaced right and left hand ratchet wheels, a threaded post fixed to the side of the bale chamber and extending outwardly therefrom, said nut member engaging said post and shiftable laterally therealong upon rotation thereof by either the upper or lower rack of the pawl member, and lever means operable by said nut member to compress or expand the size of the discharge portion of the bale chamber, said nut limited in its lateral shifting movement by the amount of offset in the upper and lower racks on the pawl member.

15. In a baler having an elongated bale forming and bale discharge chamber, a reciprocating plunger for compressing the forward end of the material to be baled, means for varying the size of the bale discharge portion of the chamber comprising, a reciprocating and vertically shiftable offset upper and lower racked pawl member, a nut member having spaced right and left hand ratchet wheels, a threaded post fixed to the side of the bale chamber and extending outwardly therefrom, said nut member engaging said post and shiftable laterally therealong upon rotation thereof by either the upper or lower rack of the pawl member, lever means operable by said nut member to compress or expand the size of the discharge portion of the bale chamber, said nut limited in its lateral shifting movement by the amount of offset in the upper and lower racks on the pawl member, a star wheel arranged to project through a slot in the elongated chamber at the bale forming portion, a bell crank member supporting said star wheel for arcuate movement into the bale being formed, the amount of movement depending on the compactness of the bale and lever means joining said bell crank and said pawl member for fixing the vertical position of the pawl member and hence determining whether the upper or lower rack thereof will engage the ratchet wheeled nut.

16. A baling mechanism comprising a baling chamber having a feed material opening therein, means for compressing said material in the chamber, the outlet end of said chamber being provided with means for adjusting the outlet area and thereby determine the resistance to movement of the bale being formed and density thereof, regulating means for operating the adjusting means of said chamber including tension members extending transversely of the bale chamber and fixed to the bale chamber at their one ends, said members at their other ends being pivotally connected to adjusting members, said adjusting members being pivoted on the bale chamber, a threaded post rigidly secured to the bale chamber, a ratchet member threaded on said post, a sleeve member fitted on the post between said ratchet member and the bale chamber, links connecting said sleeve member and the adjusting members, a pawl member extending alongside the bale chamber, said pawl member having spaced offset pawl portions engageable with either side of the ratchet member depending upon the position of the pawl member with respect thereto, said pawl portions being sufficiently far apart to permit oscillation of the pawl member without engagement of either side of the ratchet member, a continuously operating power-driven means for continuously reciprocating said pawl member, a rotary bale penetrating member, a crank member for supporting said penetrating member adjacent the bale chamber, resilient means for urging said penetrating member into the bale being formed, and linkage connecting said crank member and the pawl member, said linkage being arranged to hold the pawl member in non-engaging position with respect to the ratchet member when the bale is of the desired density and being operable to engage the ratchet member to tighten the restricting means when the bale is below the desired density and to loosen the restricting means when the bale is above the desired density, whereby the offset in the pawl portions determines limit positions for the adjustable bale discharge end.

17. In a baler, having a baling chamber and means in one end of the baling chamber for forcing material through the baling chamber, said baling chamber having a discharge portion at the opposite end for the discharge of compressed material from the baling chamber, means on the baling chamber for penetrating the compressed material therewithin, and automatic means for varying the size of the discharge portion in response to the penetration of said means in the compressed material.

18. A baler having a baling chamber and plunger means reciprocating in one end of the baling chamber for forcing and compressing material through the baling chamber, said baling chamber having a discharge portion at the opposite end for discharge of the compressed material from the baling chamber, means for penetrating the compressed material, and automatic means controlled by said penetrating means for varying the cross section of the discharge portion of the compressing chamber in accordance with the degree of penetration by the penetrating means of the material being compressed.

RUSSELL R. RANEY.

REFERENCES CITED

The following references are of record in the file of this patent:

UNITED STATES PATENTS

| Number | Name | Date |
| --- | --- | --- |
| 2,396,720 | Nolt | Mar. 19, 1946 |